United States Patent
Hayashi

(10) Patent No.: US 7,770,675 B2
(45) Date of Patent: Aug. 10, 2010

(54) ENGINE CONTROLLING DEVICE AND METHOD FOR A HYBRID VEHICLE

(75) Inventor: Nobuki Hayashi, Ebina (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 575 days.

(21) Appl. No.: 11/711,529

(22) Filed: Feb. 27, 2007

(65) Prior Publication Data

US 2007/0199745 A1    Aug. 30, 2007

(30) Foreign Application Priority Data

Feb. 28, 2006 (JP) .............................. 2006-051903

(51) Int. Cl.
*B60W 20/00* (2006.01)
(52) U.S. Cl. .............................. 180/65.265; 180/65.28
(58) Field of Classification Search .............. 180/65.25, 180/65.265, 65.28, 65.285; 903/947
See application file for complete search history.

(56) References Cited

U.S. PATENT DOCUMENTS

| | | | | | |
|---|---|---|---|---|---|
| 5,839,800 | A | * | 11/1998 | Koga et al. | 303/152 |
| 6,122,588 | A | * | 9/2000 | Shehan et al. | 701/93 |
| 6,570,265 | B1 | * | 5/2003 | Shiraishi et al. | 290/40 C |
| 6,751,534 | B2 | * | 6/2004 | Robichaux et al. | 701/22 |
| 6,813,553 | B2 | * | 11/2004 | Nakamura et al. | 701/70 |
| 6,941,198 | B2 | * | 9/2005 | Brigham et al. | 701/22 |
| 7,162,333 | B2 | * | 1/2007 | Koibuchi et al. | 701/1 |
| 7,204,222 | B2 | * | 4/2007 | Yamauchi et al. | 123/179.4 |
| 7,261,670 | B2 | * | 8/2007 | Endo et al. | 477/3 |
| 7,319,927 | B1 | * | 1/2008 | Sun et al. | 701/93 |
| 7,426,434 | B2 | * | 9/2008 | Asano | 701/109 |
| 7,451,847 | B2 | * | 11/2008 | Hommi | 180/197 |
| 7,484,816 | B2 | * | 2/2009 | Maruyama et al. | 303/191 |
| 2006/0243501 | A1 | * | 11/2006 | Hidaka | 180/65.1 |
| 2006/0272869 | A1 | * | 12/2006 | Hidaka et al. | 180/65.2 |
| 2007/0272456 | A1 | * | 11/2007 | Shiiba | 180/65.2 |
| 2007/0275818 | A1 | * | 11/2007 | Kouno | 477/3 |
| 2008/0017427 | A1 | * | 1/2008 | Nakanowatari | 180/65.2 |
| 2009/0143950 | A1 | * | 6/2009 | Hasegawa et al. | 701/68 |

FOREIGN PATENT DOCUMENTS

| | | |
|---|---|---|
| JP | 11-082260 | 3/1999 |
| JP | 2001-163087 | 6/2001 |
| JP | 2002-144921 | 5/2002 |

\* cited by examiner

*Primary Examiner*—Jeffrey J Restifo
(74) *Attorney, Agent, or Firm*—Young Basile

(57) ABSTRACT

An engine controlling device and method for a hybrid vehicle that includes an engine and a motor-generator as driving sources and has an electric-vehicle (EV) drive mode in which the vehicle is driven using only the motor-generator as a driving source and a hybrid (HEV) drive mode in which the vehicle is driven while including the engine as a driving source. When the vehicle is in a stopped state while the driving force of the engine is not being used, the device estimates a minimum driving torque required for starting the vehicle from the relationships among a brake torque, a motor-generator torque and a vehicle speed during a transitional period of a brake-pedal releasing operation. Based on the estimated minimum driving torque, the device determines prior to pressing of the accelerator pedal whether it is necessary to use the engine for a driving force of the hybrid vehicle.

20 Claims, 11 Drawing Sheets

ENGINE CONTROLLING DEVICE AND METHOD FOR A HYBRID VEHICLE

CROSS-REFERENCES TO RELATED APPLICATIONS

This application claims priority from Japanese Patent Application Serial No. 2006-051903, filed Feb. 28, 2006, which is incorporated herein in its entirety by reference.

TECHNICAL FIELD

The present invention relates to an engine controlling device and method for a hybrid vehicle equipped with an engine and a motor-generator as driving sources.

BACKGROUND

Japanese Unexamined Patent Application Publication Nos. 11-82260 and 2001-163087 disclose known examples of an engine controlling device for a hybrid vehicle. When the vehicle is in a stopped state, the engine controlling device determines whether or not to automatically stop the engine in accordance with the slope angle of the road. Based on the determination, the engine will not be stopped automatically if the vehicle makes a stop for a relatively long period of time at a place where the slope angle is large. In order to achieve the advantage of the automatic stopping function even when the vehicle is stopped on a slope road, the device allows the engine to be restarted if certain conditions are satisfied. Namely, the vehicle is on a slope, the brake is operating, and a change in brake oil pressure exceeds a predetermined amount.

BRIEF SUMMARY OF THE INVENTION

Controlling devices for a hybrid vehicle are taught herein. In one example taught therein, a controlling device for the hybrid vehicle includes an engine, a motor-generator, wheels for moving the hybrid vehicle, a brake for braking the wheels and a controller. The controller is operable to estimate an estimated driving force required for a forward movement of the vehicle when the brake is to be released from a state where the vehicle is stopped by the brake, the estimated driving force based on relationships among a braking force of the brake, a driving force of the motor-generator, and a vehicle speed. The controller is also operable to determine whether to use the engine for a driving force of the hybrid vehicle based on the estimated driving force.

Another controlling device for a hybrid vehicle having an engine, a motor-generator and a brake for braking wheels of the hybrid vehicle comprises means for estimating an estimated driving force required for a forward movement of the vehicle when the brake is to be released where the vehicle is stopped by the brake; wherein the estimated driving force is based on relationships among a braking force of the brake, a driving force of the motor-generator and a vehicle speed and means for determining whether to use the engine for a driving force of the hybrid vehicle based on the estimated driving force.

Methods for controlling a hybrid vehicle having an engine, a motor-generator and a brake for braking wheels of the hybrid vehicle are also taught herein. One exemplary method comprises estimating an estimated driving force required for a forward movement of the vehicle when the brake is to be released where the vehicle is stopped by the brake wherein the estimated driving force is based on relationships among a braking force of the brake, a driving force of the motor-generator and a vehicle speed, and determining whether to use the engine for a driving force of the hybrid vehicle based on the estimated driving force.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
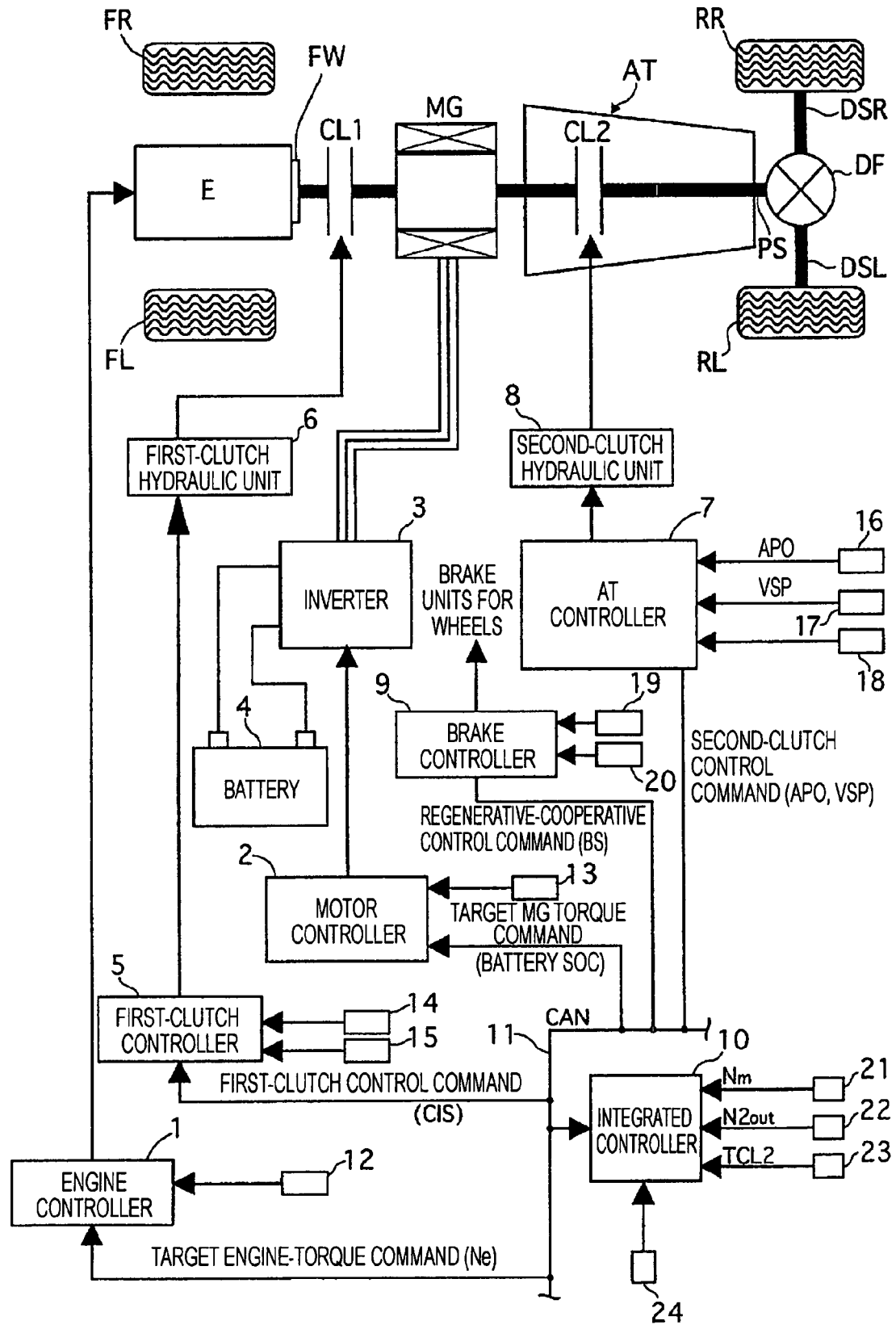
FIG. 1 is an overall systematic view of a rear-wheel-drive hybrid vehicle to which an engine controlling device according to embodiments of the invention is applied.

In such a known engine controlling device for a hybrid vehicle as those described in Japanese Unexamined Patent Application Publication Nos. 11-82260 and 2001-163087, regardless of whether a road slope is rapid or gentle the engine will be restarted when the three conditions stated above are satisfied. Namely, the vehicle is on a slope, the brake is operating, and a change in brake oil pressure exceeds a predetermined amount. For this reason, when starting the vehicle on a gentle slope, for example, even if the vehicle can actually be started under an electric-vehicle (EV) drive mode in which the vehicle is to be driven using only the motor-generator as a driving source, the engine will always be restarted when the three conditions are satisfied, regardless of the minimum driving torque required for starting the vehicle. This is problematic in view of the fact that the advantage of reducing fuel consumption by starting the vehicle under the electric-vehicle (EV) drive mode cannot be achieved.

On the other hand, for example, in a case where the minimum driving torque required for starting the vehicle is set to be determined in accordance with the operated amount of the accelerator pedal, the engine will be started after the accelerator pedal has been pressed. The accelerator pedal is performed after releasing of the brake pedal. If the slope is steep to an extent that it is not possible to start the vehicle with only the motor-generator torque, a driving force required by the vehicle cannot be attained from the point at which the accelerator pedal is pressed to the startup point of the engine, thus causing the vehicle to move backward.

An engine controlling device for a hybrid vehicle herein, however, estimates a minimum driving torque required for starting the vehicle at an early time, that is, at a point when a brake pedal is released prior to pressing of an accelerator pedal, so that the amount of backward movement upon starting the vehicle on a steep slope can be reduced while also achieving lower fuel consumption.

A hybrid vehicle includes an engine and a motor-generator as driving sources and has an electric-vehicle (EV) drive mode in which the vehicle is driven using only the motor-generator as a driving source and a hybrid (HEV) drive mode in which the vehicle is driven while including the engine as a driving source. In embodiments of the engine controlling device described herein, when the vehicle is in a stopped state while the engine is in an automatically stopped state, the device estimates a minimum driving torque required for starting the vehicle from the relationships among a brake torque, a motor-generator torque and a vehicle speed in a transitional period of a brake-pedal releasing operation. Based on the estimated minimum driving torque, the device determines prior to pressing of the accelerator pedal whether it is necessary to use the engine for the driving force.

For example, when the vehicle is to be started on an upward slope the vehicle is maintained on the slope in a state where a total torque of the brake torque and the motor-generator torque is greater than a slope resistance torque. When a driver releases his/her foot from the brake pedal to start the vehicle, the brake torque decreases, whereby the total torque of the brake torque and the motor-generator torque also decreases. Even as the total torque decreases, the vehicle is still maintained in its stopped state while the total torque is greater than the slope resistance torque. However, as soon as the total torque falls below the slope resistance torque, the vehicle begins to move backward.

In other words, since the total torque of the brake torque and the motor-generator torque at a point when the vehicle starts to move backward is substantially equal to the slope resistance torque, a minimum driving force required for starting the vehicle on a slope can be estimated with high accuracy from the relationships among the brake torque, the motor-generator torque and the vehicle speed (i.e., detection of backward movement when the vehicle speed is a negative value).

If the estimated minimum driving torque can be attained under the electric-vehicle (EV) drive mode, the vehicle is started on a slope with the selection of the electric-vehicle (EV) drive mode while maintaining the engine in an automatically stopped state, thereby achieving lower fuel consumption.

On the other hand, if the estimated minimum driving torque cannot be attained under the electric-vehicle (EV) drive mode, the engine is started before the accelerator pedal is operated. The vehicle is started on a slope with the selection of the hybrid (HEV) drive mode, thereby reducing the amount of backward movement of the vehicle when starting the vehicle on a steep slope.

Accordingly, by estimating the minimum driving torque required for starting the vehicle at an early timing, that is, at a point when the brake pedal is released prior to pressing of the accelerator pedal, the amount of backward movement upon starting the vehicle on a steep slope can be reduced while also achieving lower fuel consumption.

An engine controlling device for a hybrid vehicle according to embodiments of the invention are described below with reference to the drawings.

FIG. 1 is an overall systematic view of a rear-wheel-drive hybrid vehicle to which an engine controlling device according to embodiments of the invention is applied.

Referring to FIG. 1, the driving apparatus for the hybrid vehicle includes an engine E, a flywheel FW, a first clutch CL1, a motor-generator MG, a second clutch CL2, an automatic transmission AT, a propeller shaft PS, a differential DF, a left drive shaft DSL, a right drive shaft DSR, a left rear wheel (drive wheel) RL and a right rear wheel (drive wheel) RR. Reference characters FL and FR denote a left front wheel and a right front wheel, respectively.

The engine E may be a gasoline engine or a diesel engine and has a throttle valve whose valve opening is controlled on the basis of a control signal from an engine controller 1, which will be described hereinafter. The engine E has an output shaft on which the flywheel FW is disposed.

The first clutch CL1 is interposed between the engine E and the motor-generator MG. The engagement and disengagement, including slip engagement and slip disengagement, of the first clutch CL1 are controlled by a control oil pressure produced by a first-clutch hydraulic unit 6 on the basis of a control signal from a first-clutch controller 5, which will be described hereinafter.

The motor-generator MG is a synchronous-type motor-generator having a permanent magnet embedded in a rotor and a stator coil wound around a stator. The motor-generator MG is controlled by three-phase current produced by an inverter 3 applied thereto on the basis of a command signal from a motor controller 2, which will be described hereinafter. The motor-generator MG can function as an electric motor that is rotated by receiving electric power from a battery 4. This operational state will be referred to as a power-running state hereinafter. On the other hand, when the rotor is rotated in response to an external force, the motor-generator MG can function as a power generator for generating an electromotive force in the stator coil so as to charge the battery 4. This operational state will be referred to as a regenerative state hereinafter. The rotor of the motor-generator MG and an input shaft of the automatic transmission AT are linked to each other with a damper (not shown).

The second clutch CL2 is disposed between the motor-generator MG and the pair of left and right rear wheels RL, RR. The engagement and disengagement, including slip engagement and slip disengagement, of the second clutch CL2 are controlled by a control oil pressure produced by a second-clutch hydraulic unit 8 on the basis of a control signal from an AT controller 7, which will be described hereinafter.

The automatic transmission AT automatically changes, for example, a transmission gear ratio of five forward gears to one reverse gear in accordance with the vehicle speed and accelerator opening. The automatic transmission AT is configured such that the second clutch CL2 is not additionally provided as a designated clutch but is defined by several of a plurality of frictional engagement elements that are to be engaged at each gear stage of the automatic transmission AT. The automatic transmission AT has an output shaft that is linked to the left and right rear wheels RL, RR by the propeller shaft PS, the differential DF, the left drive shaft DSL and the right drive shaft DSR.

For each of the first clutch CL1 and the second clutch CL2, a wet multi-plate clutch is used by example, which can continuously control the oil flow rate and oil pressure using a proportional solenoid.

The driving apparatus for the hybrid vehicle has two drive modes in accordance with the engaged and disengaged states of the first clutch CL1. A disengaged state of the first clutch CL1 corresponds to an electric-vehicle drive mode in which the vehicle is driven using the driving force of the motor-generator MG as a driving source. The electric-vehicle drive mode will be referred to as an EV drive mode hereinafter. Conversely, an engaged state of the first clutch CL1 corresponds to a hybrid drive mode in which the vehicle is driven using the motor-generator MG and/or the engine E as a driving source or driving sources. The hybrid drive mode will be referred to as an HEV drive mode hereinafter.

The HEV drive mode includes three drive modes, which are an engine drive mode, a motor-assisted drive mode, and a driving/power-generating mode. In the engine drive mode the drive wheels are driven using only the engine E as a driving source. In the motor-assisted drive mode the drive wheels are driven using two driving sources, which are the engine E and the motor-generator MG. In the driving/power-generating mode the drive wheels RR, RL are driven with the engine E as a driving source while the motor-generator MG functions as a power generator.

When the vehicle is traveling at a constant rate or is accelerating, the motor-generator MG operates as a power generator by using the power of the engine E. On the other hand, when the vehicle is decelerating, a braking energy is regenerated so that the motor-generator MG generates electric power used for charging the battery 4.

Next, the control system of the hybrid vehicle will be described. Referring to FIG. 1, the exemplary control system of the hybrid vehicle includes the engine controller 1, the motor controller 2, the inverter 3, the battery 4, the first-clutch controller 5, the first-clutch hydraulic unit 6, the AT controller 7, the second-clutch hydraulic unit 8, a brake controller 9 and an integrated controller 10. The engine controller 1, the motor controller 2, the first-clutch controller 5, the AT controller 7, the brake controller 9 and the integrated controller 10 are connected to one another with an information-exchangeable CAN communication line 11.

The engine controller 1 receives engine-speed information from an engine-speed sensor 12 and outputs a command for controlling engine-operating points (Ne, Te) to a throttle-valve actuator (not shown) in response to, for example, a target engine torque command from the integrated controller 10. The engine speed information is sent to the integrated controller 10 via the CAN communication line 11.

The motor controller 2 receives rotational-position information from a resolver 13 and outputs a command for controlling motor-operating points (Nm, Tm) of the motor-generator MG to the inverter 3 in response to, for example, a target motor-generator torque command from the integrated controller 10. The resolver 13 detects the rotational position of the rotor included in the motor-generator MG. The motor controller 2 monitors the state of charge SOC of the battery 4. The information regarding the state of charge SOC of the battery 4 is used as control information for the motor-generator MG and is sent to the integrated controller 10 via the CAN communication line 11.

The first-clutch controller 5 receives sensor information from a first-clutch oil-pressure sensor 14 and a first-clutch stroke sensor 15 and outputs a command for controlling the engagement/disengagement of the first clutch CL1 to the first-clutch hydraulic unit 6 in response to a first-clutch control command from the integrated controller 10. The first-clutch stroke information C1S is sent to the integrated controller 10 via the CAN communication line 11.

The AT controller 7 receives sensor information from an accelerator-opening sensor 16, a vehicle-speed sensor 17 and a second-clutch oil-pressure sensor 18 and outputs a command for controlling the engagement/disengagement of the second clutch CL2 to the second-clutch hydraulic unit 8 in an AT hydraulic control valve in response to a second-clutch control command from the integrated controller 10. The information regarding the accelerator opening APO and the vehicle speed VSP is sent to the integrated controller 10 via the CAN communication line 11.

The brake controller 9 receives sensor information from a wheel speed sensor 19, which detects the speed of each of the four wheels, and from a brake stroke sensor 20. When a brake pedal is pressed for braking, for example, if a required braking force determined from brake stroke BS is not sufficient with only a regenerative braking force, a regenerative-cooperative brake control operation is performed on the basis of a regenerative-cooperative control command from the integrated controller 10. As a result, the insufficient amount of braking force is compensated for by a mechanical braking force, such as a hydraulic braking force and a motor braking force.

The integrated controller 10 manages the consumption energy of the entire vehicle and has the function of allowing the vehicle to run at optimal efficiency. The integrated controller 10 receives information from a motor rotating-speed sensor 21 for detecting a motor rotating-speed Nm, from a second-clutch output-speed sensor 22 for detecting a second-clutch output-speed N2out, from a second-clutch torque sensor 23 for detecting a second-clutch torque TCL2 and from a brake oil-pressure sensor 24. The integrated controller 10 also receives information obtained via the CAN communication line 11. The integrated controller 10 controls the engine E by sending a command signal to the engine controller 1, controls the motor-generator MG by sending a command signal to the motor controller 2, controls the engagement and disengagement of the first clutch CL1 by sending a command signal to the first-clutch controller 5 and controls the engagement and disengagement of the second clutch CL2 by sending a command signal to the AT controller 7.

Figure 2:
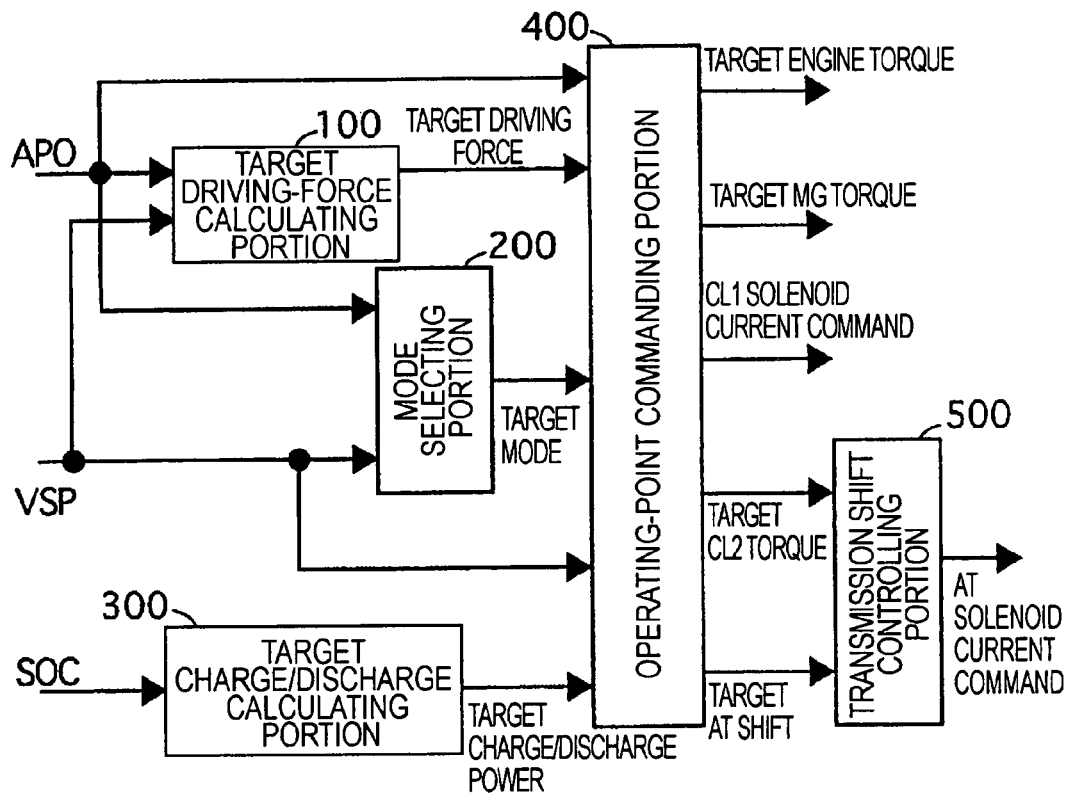
FIG. 2 is a control block diagram illustrating a calculation program included in an integrated controller according to a first embodiment.

FIG. 2 is a block diagram used for describing a calculation performed in the integrated controller 10 according to a first embodiment. For example, this calculation is implemented in the integrated controller 10 in control cycles of 10 milliseconds. The integrated controller 10 includes a target driving-force calculating portion 100, a mode selecting portion 200, a target charge/discharge calculating portion 300, an operating-point commanding portion 400 and a transmission shift controlling portion 500.

Figure 3:
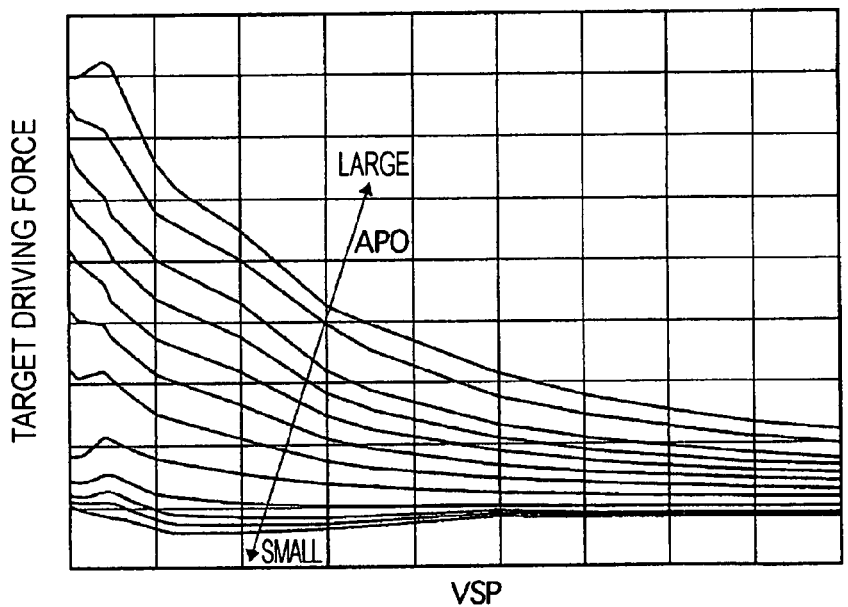
FIG. 3 illustrates an example of a target driving-force map used for calculating a target driving force in a target driving-force calculating portion shown in FIG. 2.

The target driving-force calculating portion 100 calculates a target driving force tFoO from the accelerator opening APO and the vehicle speed VSP using a target driving-force map as shown in FIG. 3.

Figure 4:
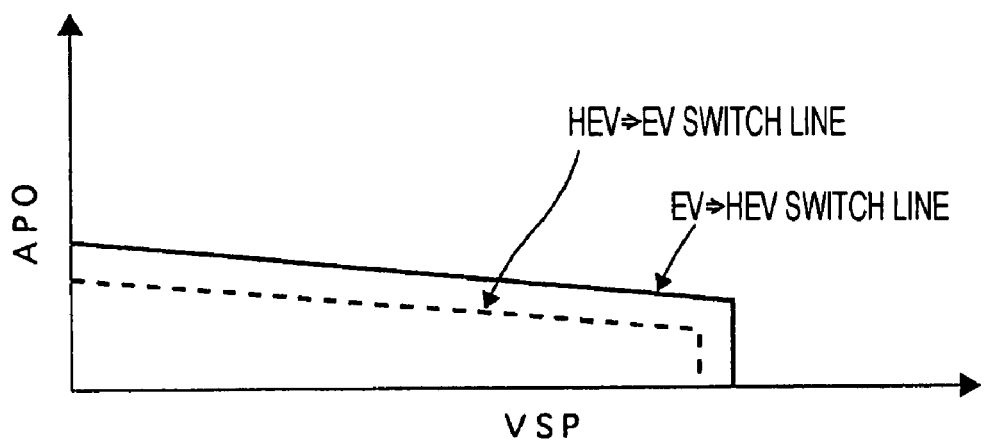
FIG. 4 illustrates an example of a target mode map used for selecting a target mode in a mode selecting portion shown in FIG. 2.

The mode selecting portion 200 determines a target mode on the basis of the accelerator opening APO and the vehicle speed VSP using an EV-HEV selection map as shown in FIG. 4. In this case, if the state of charge SOC of the battery 4 is equal to or below a predetermined value, the target mode is automatically set to the HEV drive mode.

Figure 5:
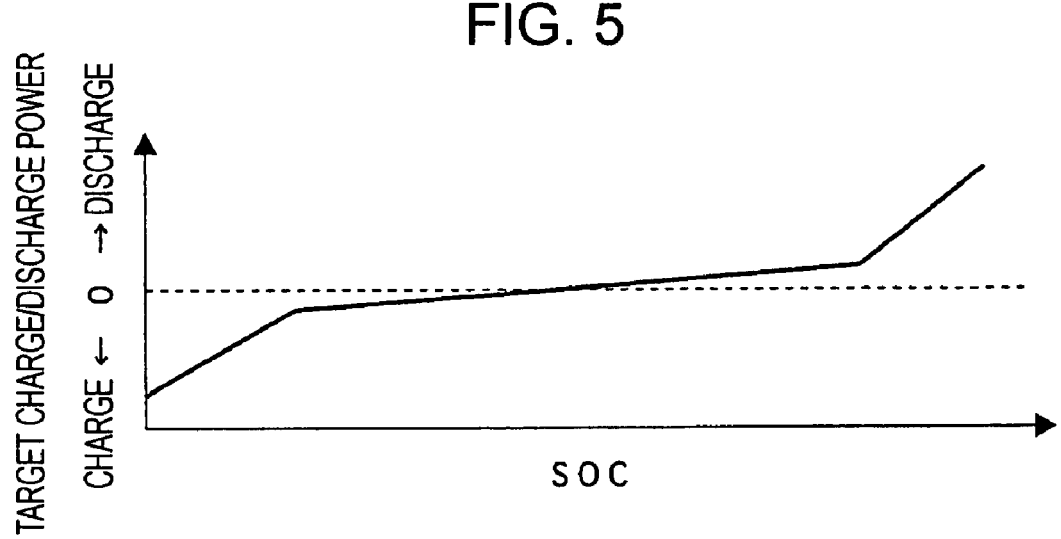
FIG. 5 illustrates an example of a target charge/discharge power map used for calculating target charge/discharge power in a target charge/discharge calculating portion shown in FIG. 2.

The target charge/discharge calculating portion 300 calculates a target charge/discharge power tP on the basis of the state of charge SOC of the battery 4 using a target charge/discharge power map as shown in FIG. 5.

The operating-point commanding portion 400 calculates a transient target engine torque, a transient target motor-generator torque, a transient target second-clutch torque transfer capacity, a transient target automatic-transmission shift and a transient first-clutch solenoid current command as target values for attaining operating points on the basis of the accelerator opening APO, the target driving force tFoO, the target mode, the vehicle speed VSP and the target charge/discharge power tP.

The transmission shift controlling portion 500 drives a solenoid valve included in the automatic transmission AT so that the target second-clutch torque transfer capacity and the target automatic-transmission shift are achieved.

Figure 6:
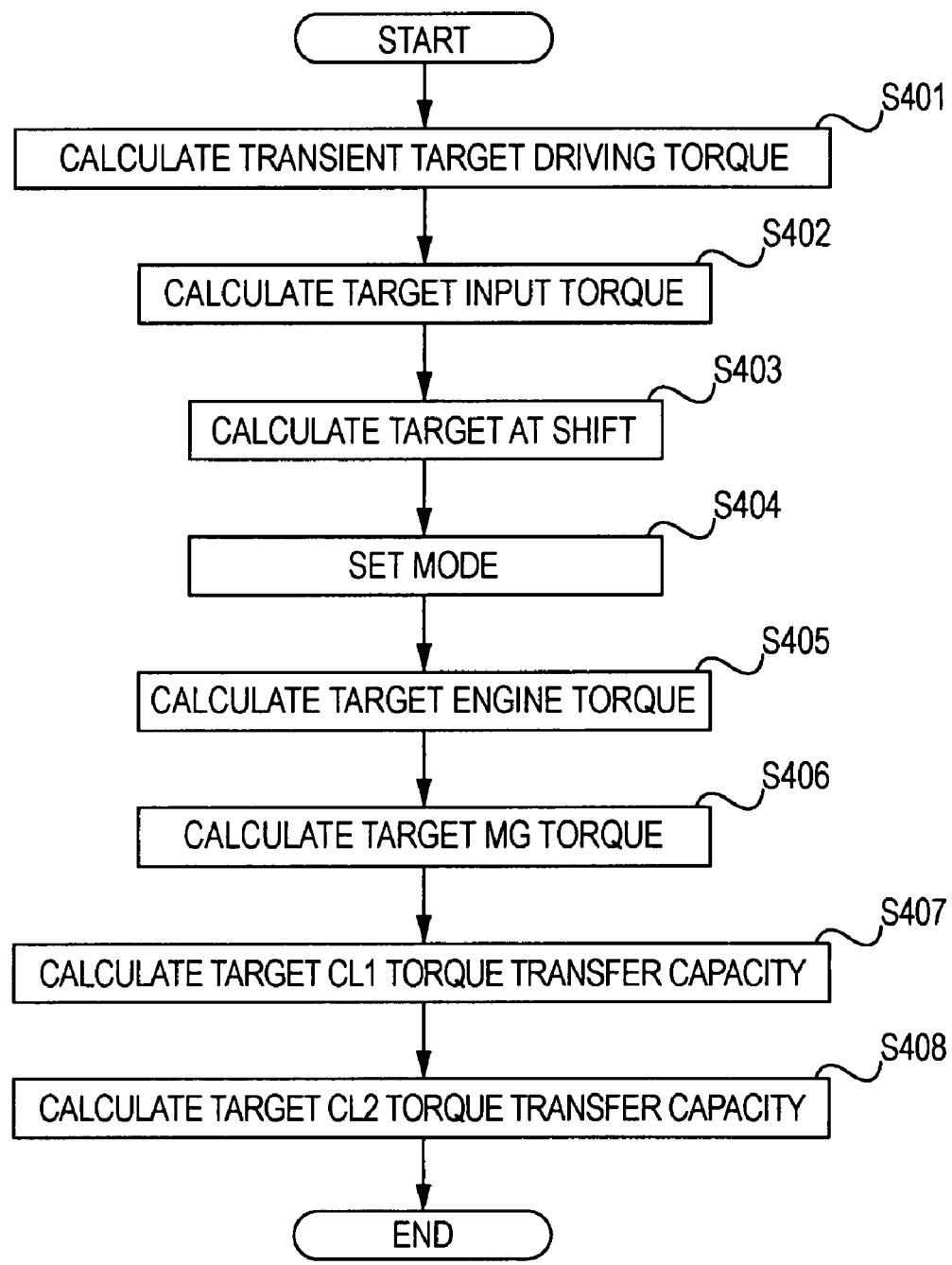
FIG. 6 is a flow chart illustrating a calculation process for determining operating points in an operating-point commanding portion shown in FIG. 2.

FIG. 6 is a flow chart illustrating a calculating process of the operating points implemented in the operating-point commanding portion 400 of the integrated controller 10. In step S401, a transient target driving torque, or force, tFo is calculated by performing predetermined processing on the target driving force tFoO. For example, a lowpass filter output having a predetermined time constant that requires input of the target driving force tFoO is used as the transient target driving force tFo.

Following the calculation of the transient target driving force tFo in step S401, the following expression is used in step S402 to calculate a target input torque tTin for the automatic transmission AT:

$$tTin = tFo \times rt/if/iG; \text{ wherein} \tag{1}$$

rt denotes a radius of a tire;

if denotes a final gear ratio; and iG denotes a gear ratio of the actual automatic-transmission shift at the current moment.

Figure 7:
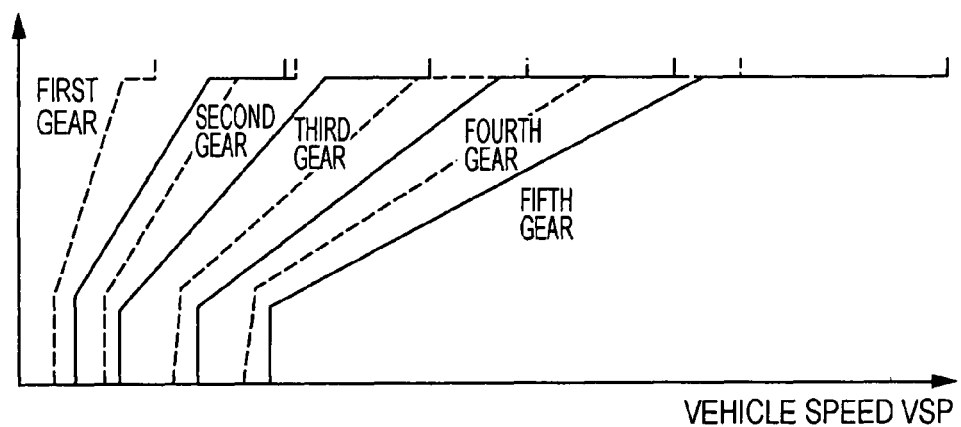
FIG. 7 illustrates an example of a shift map used in a step for calculating a target automatic-transmission shift in FIG. 6.

Following the calculation of the target input torque tTin in step S402, a shift map as in FIG. 7 is used in step S403 to calculate a target automatic-transmission shift on the basis of the accelerator opening APO and the vehicle speed VSP. In FIG. 7, a solid line represents upshifting and a dotted line represents downshifting.

Following the calculation of the target automatic-transmission shift in step S403, a mode selection is implemented in step S404 in accordance with the target mode. Normally, the vehicle is driven steadily under the EV drive mode or the HEV drive mode. However, if the operating points cross over an HEV⇒EV switch line in an EV-HEV selection map as shown in FIG. 4, mode transition control is implemented to switch from the HEV drive mode to the EV drive mode. On the other hand, if the operating points cross over an HEV⇒EV switch line in the EV-HEV selection map as shown in FIG. 4, mode transition control is implemented to switch from the EV drive mode to the HEV drive mode.

Following the mode setting process in step S404, if the drive mode is the HEV drive mode, the following expression is used in step S405 in order to calculate an ideal engine torque tTeO on the basis of the target input torque tTin, the automatic-transmission input rotating speed Nin and the engine speed Ne:

$$tTeO = (tTin \times Nin - tP)/Ne. \tag{2}$$

Figure 8:
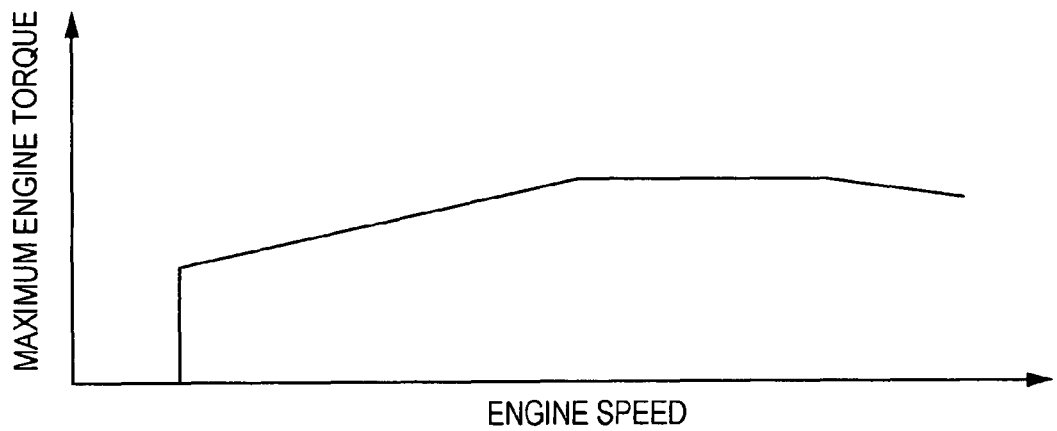
FIG. 8 is an example of a maximum-engine-torque versus engine-speed map used in a step for calculating a target engine torque in FIG. 6.

In reference to a maximum engine-torque map as shown in FIG. 8, a target engine torque tTe is determined by setting a limit on the ideal engine torque tTeO with a maximum engine torque corresponding to the engine speed Ne. On the other hand, if the drive mode is the EV drive mode, the target engine torque tTe is set to zero.

Following the calculation of the target engine torque tTe in step S405, when the drive mode is the EV drive mode or the HEV drive mode, the following expression is used in step S406 in order to calculate a target motor-generator torque tTm:

$$tTm = tTin - tTe. \tag{3}$$

If the mode is in the course of switching, the target motor-generator torque tTm is determined in accordance with the operation performed during the mode switching.

Following the calculation of the target motor-generator torque tTm in step S406, if the drive mode is the EV drive mode a target first-clutch torque transfer capacity is set to zero in step S407. In contrast, if the drive mode is the HEV drive mode the target first-clutch torque transfer capacity is set to a maximum value. If the mode is in the course of switching, the target first-clutch torque transfer capacity is determined in accordance with the operation performed during the mode switching.

Following the calculation of the target first-clutch torque transfer capacity in step S407, if in the EV drive mode a target second-clutch torque transfer capacity tcTcl2 is set to a maximum driving-force equivalent evTmax for the EV drive mode in step S408. On the other hand, if in the HEV drive mode the target second-clutch torque transfer capacity tcTcl2 is set to a maximum value. If the mode is in the course of switching, the target second-clutch torque transfer capacity tcTcl2 is determined in accordance with the operation performed during the mode switching. This completes the operation according to FIG. 6.

Figure 9:
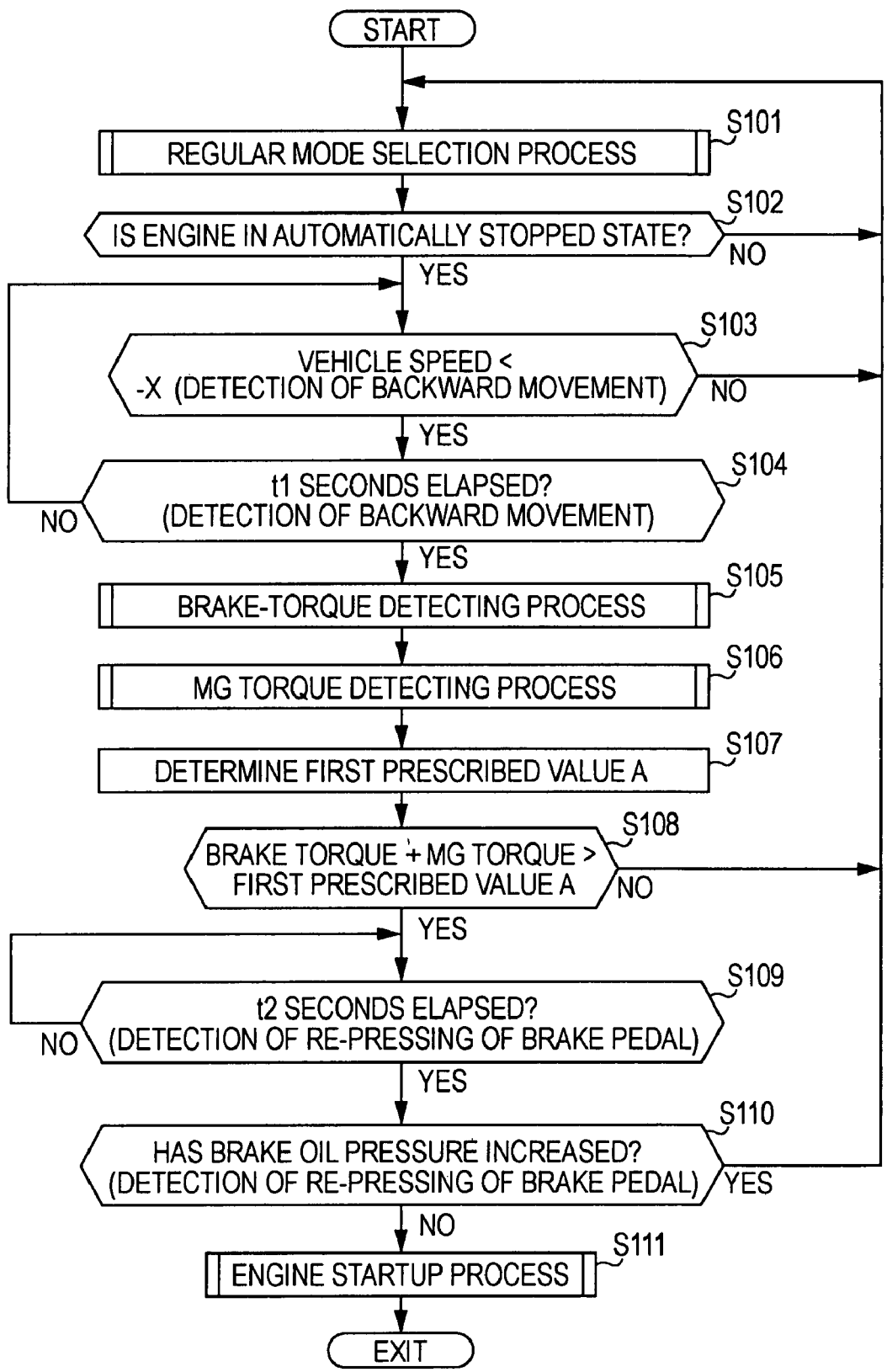
FIG. 9 is a flow chart illustrating an engine controlling process executed in the integrated controller according to the first embodiment.

FIG. 9 is a flow chart illustrating an engine controlling process performed by the integrated controller 10 when starting the vehicle according to the first embodiment. The steps included in this process will be described below, and this process is performed in, for example, control cycles of 10 milliseconds.

In step S101, a regular mode selection process is performed. More specifically, in step S404 in FIG. 6, either the EV drive mode or the HEV drive mode is selected on the basis of the accelerator opening APO, the vehicle speed VSP and the map shown in FIG. 4. Basically, if the vehicle is in a stopped state (vehicle speed VSP=0), and the accelerator pedal is not pressed (accelerator opening APO=0), the EV drive mode is selected as the drive mode (see FIG. 4).

Following the regular mode selection process in step S101, it is determined in step S102 whether the engine E is in an automatically stopped state. If yes (that is, if the EV drive mode is selected), the operation proceeds to step S103. If no (that is, if the HEV drive mode is selected), the operation returns to step S101.

In step S103 it is determined whether or not the vehicle speed based on the wheel-speed information from the wheel speed sensor 19 is below −X km/h, which is a negative value close to zero. If yes, processing advances to step S104. If no, processing returns to step S101.

Figure 10:
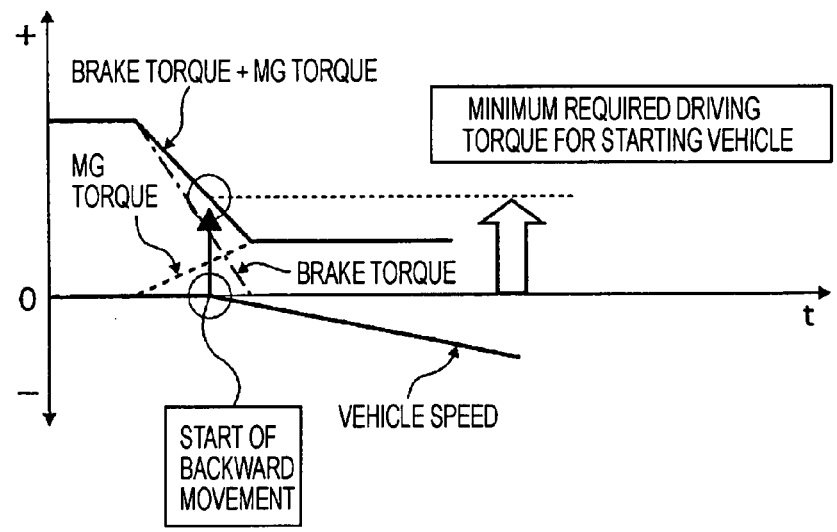
FIG. 10 is a time chart illustrating the relationships among the brake torque, the motor-generator torque, and the vehicle speed when starting the vehicle on a steep upward slope.

In other words, referring to FIG. 10, when starting the vehicle on a steep upward slope, the vehicle first moves backward from a point at which the total torque of the brake torque and the motor-generator torque in the transitional period of the brake-pedal releasing operation falls below a minimum driving torque required for starting the vehicle. At this time, the vehicle speed will be a negative value that is close to zero.

Following the determination of whether or not the vehicle speed is below −X km/h in step S103, it is determined in step S1104 whether the state of vehicle speed <−X continues for t1 seconds. If yes, processing advances to step S105. If no, processing returns to step S103.

Figure 11:
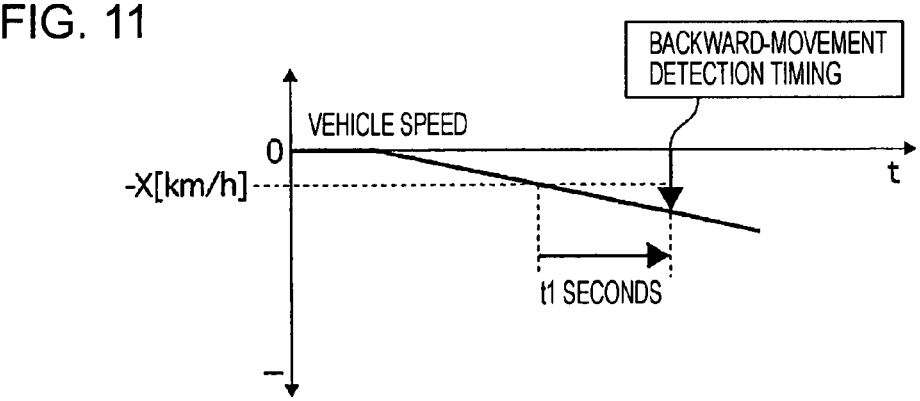
FIG. 11 is a time chart illustrating a method for detecting a backward movement of the vehicle.

In other words, referring to FIG. 11, since the vehicle speed continues to decrease even after the vehicle speed falls below −X km/h when starting the vehicle on a steep upward slope, the point to which the state of vehicle speed <−X continues for t1 seconds is set as a backward-movement detection timing. This is for preventing backward-movement detection errors, which may be caused when the vehicle speed is momentarily detected as being below −X km/h due to, for example, sensor noise.

Figure 12:
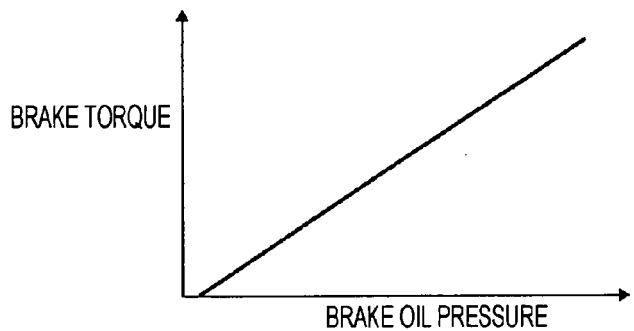
FIG. 12 illustrates an example of a brake-torque map that corresponds to brake oil pressure.

Following the determination of whether the state of vehicle speed <−X has continued for t1 seconds in step S104, or in other words, whether or not the vehicle has undergone a backward movement, brake oil pressure from the brake oil-pressure sensor 24 and a brake torque map are used in step S105 to calculate a brake torque from a brake oil-pressure detection value. The relationship of the brake torque to the brake oil pressure is a linear relationship graphically shown in FIG. 12, which is developed based on test data.

Following the brake-torque detecting process in step S105, a motor-generator torque detecting process is performed in step S106. For example, in the motor-generator torque detecting process, the target motor-generator torque tTm (=tTin−tTe) calculated in step S406 in FIG. 6 is detected as a motor-generator torque.

Following the motor-generator torque detecting process in step S106, a first predetermined value A is set where first predetermined value A is a threshold value for determining a startup request of the engine E. First predetermined value A is set to a value of a maximum driving torque of the motor-generator MG under the EV drive mode in step S1107, the value being a fixed value or a driving torque value that can be exerted maximally by the motor-generator MG under the current state of charge of the battery.

After determining the first predetermined value A in step S107, it is determined in step S108 whether the total torque of the brake torque in step S105 and the motor-generator torque in step S106 is greater than the first predetermined value A. If yes, an engine startup standby flag is raised, and the process advances to step S1109. If no, processing returns to step S101.

In step S1109, it is determined whether t2 seconds have elapsed since the raising of the engine startup standby flag in step S108. If yes, the operation proceeds to step S110. If no, the determination process in step S109 is repeated.

Once it is determined in step S109 that t2 seconds have elapsed since the raising of the engine startup standby flag, processing advances to step S110 where it is determined whether the brake oil pressure has decreased by a certain value ΔP1 or more or has increased by a certain value ΔP2 or more (including zero) in comparison to that at the time of engine-startup standby determination in step S108. If yes, the operation returns to step S101. If no, processing advances to step S111.

Figure 13:
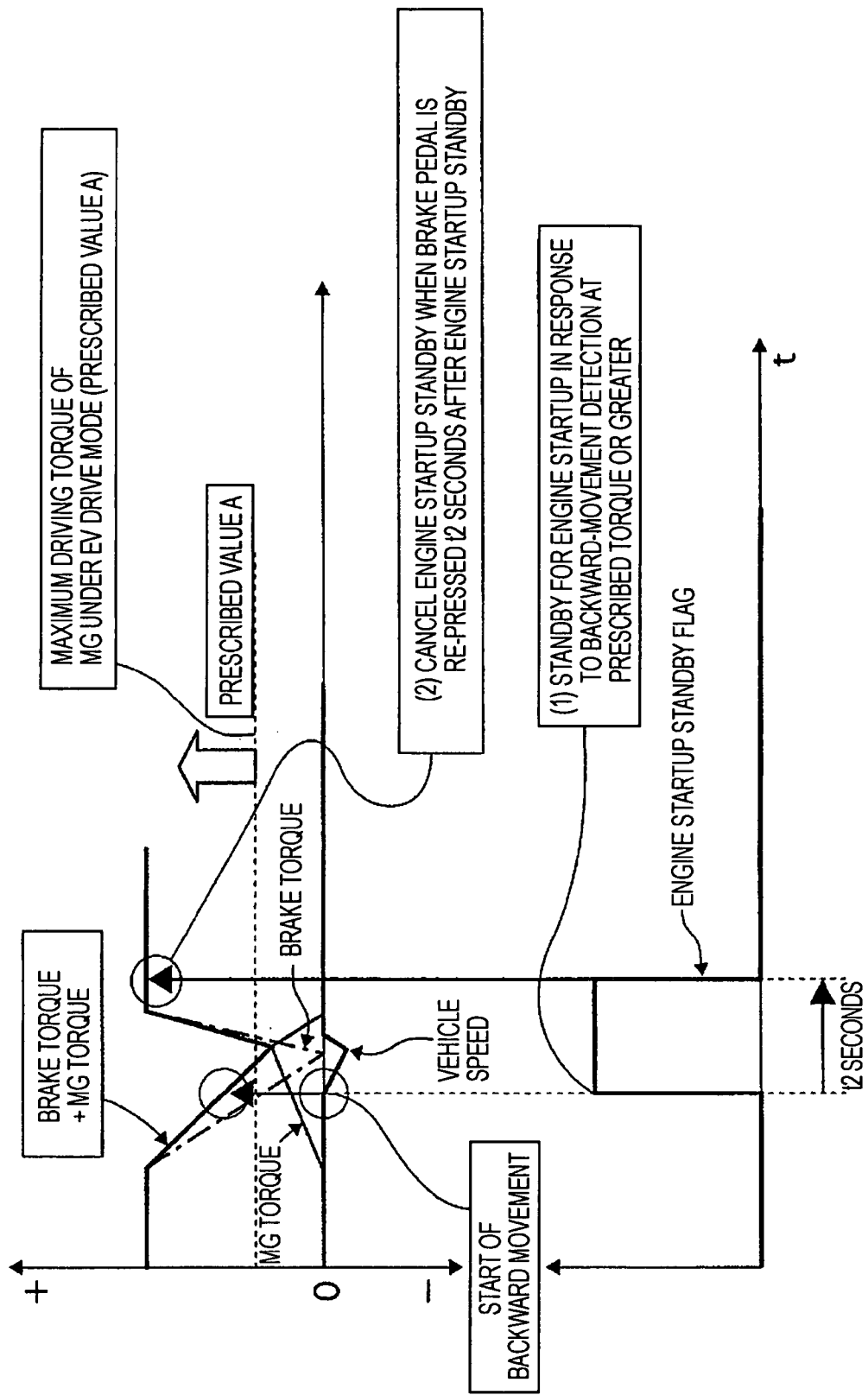
FIG. 13 is a time chart illustrating the relationships among the brake torque, the motor-generator torque, the vehicle speed and a first value A in a case where a brake pedal is re-pressed when the vehicle is on a steep upward slope.

For example, in step S110 if the brake oil pressure has increased at a point when t2 seconds have elapsed since the raising of the engine startup standby flag in step S108, it is determined that the brake pedal has been re-pressed as shown in FIG. 13. On the other hand, if the brake oil pressure has not decreased by the value ΔP1 or more at a point when t2 seconds have elapsed, it is determined that the brake pedal remains pressed or that the brake pedal is getting ready to be re-pressed. In either case, it is determined that the driver desires to stop the vehicle. Therefore, the engine startup standby flag is cleared, and the engine startup is not executed (i.e., processing returns to S101). In contrast, if it is determined that the brake oil pressure has decreased and that the brake pedal has not been re-pressed, the operation proceeds to step S111.

In step S111 it is decided to make the transition to start the vehicle without re-pressing of the brake pedal in step S110. In other words, after determining that all engine startup conditions have been satisfied the startup process of the engine E is executed, and an exceptional mode transition is made from the EV drive mode to the HEV drive mode, thereby preparing for starting the vehicle on a slope in response to pressing of the accelerator pedal.

More specifically, the engine startup conditions include four conditions, which are:

(a) an automatically stopped state of the engine E;
(b) detection of backward movement;
(c) brake torque+MG torque>first value A; and
(d) no re-pressing of the brake pedal.

The operation shifts to the regular mode selection process when the following conditions are satisfied: (1) when a predetermined time period has elapsed since the starting of the vehicle on a slope in response to the engine startup; (2) when it is determined that the vehicle has traveled past an upward slope; and (3) when the operating points corresponding to the accelerator opening APO and the vehicle speed VSP in the map shown in FIG. 4 are in the HEV drive mode range.

The operation of the first embodiment is now described.

When a hybrid vehicle equipped with an engine, a motor-generator and a battery is traveling under low load, including the starting period of the vehicle, the engine efficiency is generally low. Therefore, in order to reduce the fuel consumption the vehicle is driven with only the motor-generator (i.e., under the EV drive mode).

On the other hand, when the vehicle is traveling under high load, such as during a rapid acceleration period, the driving force required by the vehicle is large. This implies that the vehicle requires engine torque as a driving force. Therefore, engine startup is executed if a target driving force determined from the accelerator opening and the vehicle speed is greater than a predetermined value.

Conventionally, the engine is started when an engine startup request is determined based on an increase in the accelerator opening in response to an operation of the accelerator pedal. With this startup timing, however, if the vehicle is started on an upward slope that is too steep to be climbed under the EV drive mode, a driving force required by the vehicle may be difficult to attain from the point at which the accelerator pedal is pressed to the startup point of the engine. As a result, the vehicle will undesirably move backward.

In contrast, in the engine controlling device for the hybrid vehicle according to the first embodiment, a minimum driving torque required for starting the vehicle is estimated at an early timing, that is, at a point when the brake pedal is released prior to the pressing of the accelerator pedal. This contributes to lower fuel consumption while reducing the amount of backward movement of the vehicle when starting the vehicle on a steep slope.

Specifically, when the driver desires to start the vehicle that is stopped on an upward slope, the driver will first gradually release his/her foot from the brake pedal. Subsequently, the driver will press on the accelerator pedal. The condition of a transitional period of the brake-pedal releasing operation performed prior to the accelerator-pedal operation will be described in detail. As the brake-pedal releasing operation proceeds, the brake torque decreases, and the total torque of the brake torque and the motor-generator torque similarly decreases. Even as the total torque decreases, the vehicle is still maintained in its stopped state while the total torque is greater than the slope resistance torque. However, as soon as the total torque falls below the slope resistance torque the vehicle begins to move backward from the stopped state.

Embodiments of the invention focus on the fact that the total torque of the brake torque and the motor-generator torque at the starting point of the backward movement of the vehicle is substantially equal to the slope resistance torque. In view of this fact, a minimum driving torque required for starting the vehicle is estimated from the relationships among the brake torque, the motor-generator torque and the vehicle speed during the transitional period of the brake-pedal releasing operation when the vehicle is in a stopped state while the engine is in an automatically stopped state (more precisely, when the vehicle is subject to slight backward movement). Based on the estimated minimum driving torque required for starting the vehicle, embodiments of the invention determine whether to start the engine prior to pressing of the accelerator pedal.

Accordingly, based on the relationships among the brake torque, the motor-generator torque and the vehicle speed (i.e., detection of backward movement when the vehicle speed is a negative value) during the transitional period of the brake-pedal releasing operation, a minimum driving force required for starting the vehicle on a slope can be estimated with high accuracy.

If the estimated minimum driving torque can be attained under the EV drive mode, the vehicle is started on a slope with the selection of the EV drive mode while maintaining the engine in an automatically stopped state, thereby achieving lower fuel consumption.

On the other hand, if the estimated minimum driving torque cannot be attained under the EV drive mode, the engine is started before the accelerator pedal is operated. The vehicle is started on a slope with the selection of the HEV drive mode, thereby reducing the amount of backward movement of the vehicle when starting the vehicle on a steep slope.

As a result, the minimum driving torque required for starting the vehicle is estimated at an early timing, that is, at a point when the brake pedal is released prior to the pressing of the accelerator pedal. This contributes to lower fuel consumption while reducing the amount of backward movement of the vehicle when starting the vehicle on a steep slope.

The description below is directed to various types of operations that can be performed in the engine controlling device for the hybrid vehicle according to the first embodiment. The operations include an operation performed when starting the vehicle on a flat road or a downward slope, an operation performed when starting the vehicle on a gentle upward slope and an operation performed for controlling the engine when starting the vehicle on a steep upward slope.

Figure 14:
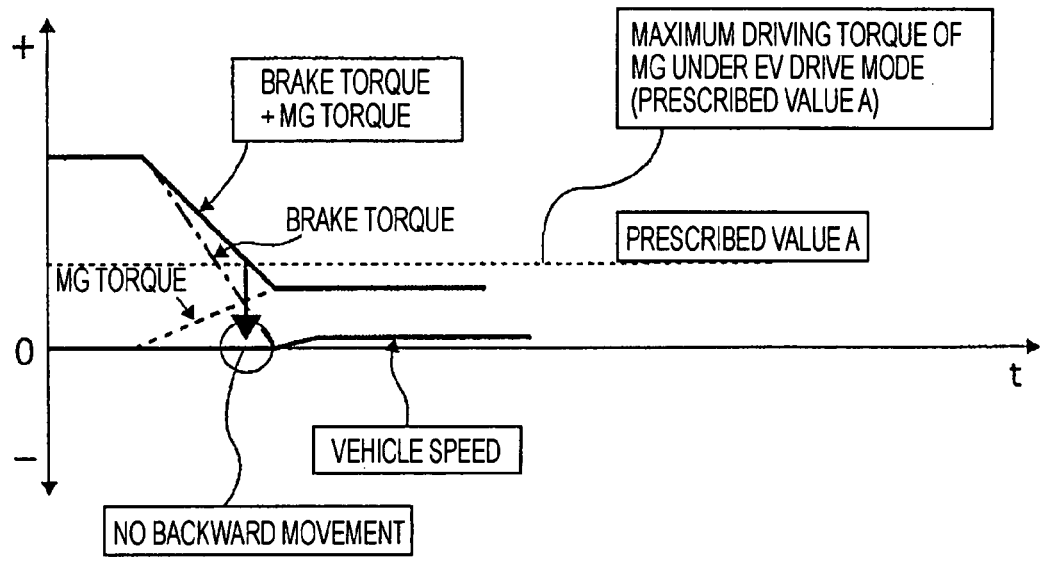
FIG. 14 is a time chart illustrating the relationships among the brake torque, the motor-generator torque, the vehicle speed and the first value A when starting the vehicle on a flat road.

The operation performed when starting the vehicle on a flat road or a downward slope is first described. When the engine is in an automatically stopped state, and the vehicle is to be started from its stopped state on a flat road, even if the driver implements a brake-pedal releasing operation to start the vehicle, the vehicle speed will remain at zero or the vehicle will slightly move forward due to the motor-generator torque, as shown in FIG. 14. Consequently, since the vehicle does not move backward, the answer to the query in step S103 is "NO." The cycle of step S101, step S102 and step S103 in the flow chart in FIG. 9 is repeated. Moreover, the drive mode is selected on the basis of the regular mode selection process in step S101.

When the engine is in an automatically stopped state, and the vehicle is to be started from its stopped state on a downward slope, if the driver implements a brake-pedal releasing operation to start the vehicle, a slope running torque produced as a result of the downward slope is added to the motor-generator torque. As a consequence, the vehicle starts to move forward in the middle of the brake-pedal releasing operation. Since the vehicle does not move backward, the response to the query in S103 is "NO," and the cycle of step S101, step S102 and step S103 in the flow chart in FIG. 9 is repeated. Moreover, the drive mode is selected on the basis of the regular mode selection process in step S101.

In other words, when starting the vehicle on a flat road or a downward slope, the drive mode selected in accordance with the accelerator opening APO, the vehicle speed VSP and the state of charge SOC of the battery 4 is basically the one that can provide a driving force corresponding to the accelerator opening APO desired by the driver. For example, if starting the vehicle on a flat road or a downward slope with a small accelerator opening APO, the vehicle will travel under the EV drive mode. If starting the vehicle with a larger accelerator opening APO, the vehicle will be started by starting up the engine E or by selecting one of the motor-assisted drive mode and the engine drive mode while starting up the engine E depending on the required driving force or the state of charge SOC of the battery 4.

As described above, in the engine controlling device according to the first embodiment, when the vehicle is in a stopped state while the engine E is in an automatically stopped state (step S102), the engine controlling means (FIG. 9) determines that the startup of the engine E is not requested if the stopped state of the vehicle is maintained. That is, if the vehicle speed remains at zero in the transitional period of the brake-pedal releasing operation in which the total of the brake torque and the motor-generator torque decreases, or if a forward movement of the vehicle is detected, that is, if the vehicle speed is a positive value ("NO" in step S103), the engine controlling means determines that the startup of the engine E is not requested.

As a comparative example, if the device is set such that the engine is constantly requested regardless of whether the vehicle is maintained in a stopped state in the transitional period of the brake-pedal releasing operation, or a forward movement of the vehicle is detected, the HEV drive mode will be selected even if the vehicle is to be started with a small accelerator opening. In this case, the advantage of reducing fuel consumption by selecting the EV drive mode for the starting of the vehicle is not achieved.

In contrast, according to the first embodiment, when starting the vehicle from its stopped state on a flat road or a downward slope, in order to determine that the startup of the engine E is not requested when the stopped state of the vehicle is maintained in the transitional period of the brake-pedal releasing operation, or when a forward movement of the vehicle is detected, an optimal drive mode is selected in response to a driving force desired by the driver that corresponds to the accelerator opening APO. Accordingly, this contributes to both lower fuel consumption and high starting performance of the vehicle.

An operation performed when starting the vehicle on a gentle upward slope will now be described. When the engine is in an automatically stopped state, and the vehicle is to be started from its stopped state on a gentle upward slope, even if the driver implements a brake-pedal releasing operation to start the vehicle the vehicle speed will remain at zero or the vehicle will only move forward slightly. The vehicle speed will remain in this state as long as the decreasing total torque of the brake torque and the motor-generator torque does not become equal to or less than the slope resistance torque. Consequently, the response to the query in step S103 is "NO," and the cycle of step S101, step S102 and step S103 in the flow chart in FIG. 9 is repeated. Moreover, the drive mode is selected on the basis of the regular mode selection process in step S101.

Assuming that the engine is in an automatically stopped state, and the vehicle is to be started from its stopped state on a gentle upward slope, when the driver releases the brake pedal to start the vehicle the total of the brake torque and the motor-generator torque decreases. When the total torque falls below the slope resistance torque, the vehicle moves backward due to the slope resistance torque at a time when the total torque becomes less than the slope resistance torque. However, at this backward-movement timing of the vehicle on a gentle upward slope, the total torque of the brake torque and the motor-generator torque is equal to or less than the first predetermined value A. For this reason, the response to the query in step S108 is "NO," and the cycle of step S101, step S102, step S103, step S104, step S105, step S106, step S107 and step S108 in the flow chart in FIG. 9 is repeated. Moreover, the drive mode is selected on the basis of the regular mode selection process in step S101.

In other words, when starting the vehicle on a gentle upward slope, even if a backward movement of the vehicle is detected during the transitional period of the brake-pedal releasing operation, it is confirmed that a driving force required by the vehicle can be attained with the selection of the EV drive mode in which the engine E remains in a stopped state. This is due to the fact that the total torque of the brake torque and the motor-generator torque is equal to or less than the first predetermined value A.

Consequently, similar to when starting the vehicle on a flat road or a downward slope, the drive mode selected in accordance with the accelerator opening APO, the vehicle speed VSP and the state of charge SOC of the battery 4 is basically the one that can provide a driving force corresponding to the accelerator opening APO desired by the driver. For example, if starting the vehicle on a gentle upward slope with a small accelerator opening APO, the vehicle will travel under the EV drive mode. If starting the vehicle with a larger accelerator opening APO, the vehicle will be started by starting up the engine E or by selecting one of the motor-assisted drive mode and the engine drive mode while starting up the engine E, depending on the required driving force or the state of charge SOC of the battery 4.

In the engine controlling device according to the first embodiment, when the vehicle is in a stopped state while the engine E is in an automatically stopped state (step S102), the engine controlling means (FIG. 9) determines that the startup of the engine E is not requested if the total of the brake torque and the motor-generator torque is below the first predetermined value A ("NO" in step S108) at the time of backward-movement detection (step S104) at which the vehicle speed is a negative value in the transitional period of the brake-pedal releasing operation.

As a comparative example, if the device is set such that the engine startup is constantly requested regardless of whether the upward slope is rapid or gentle, the HEV drive mode will be selected even if the upward slope is gentle to an extent that a driving force for starting the vehicle on the slope can be sufficiently attained with the selection of the EV drive mode. In this case, the advantage of reducing fuel consumption by selecting the EV drive mode for the starting of the vehicle is not achieved.

In contrast, according to the first embodiment, when starting the vehicle from its stopped state on a gentle upward slope, in order to determine that the startup of the engine E is not requested when the total of the brake torque and the motor-generator torque at the time of backward-movement detection is below the first predetermined value, an optimal drive mode is selected in response to a driving force desired by the driver that corresponds to the accelerator opening APO. Accordingly, this contributes to both lower fuel consumption and high starting performance of the vehicle.

Figure 15:
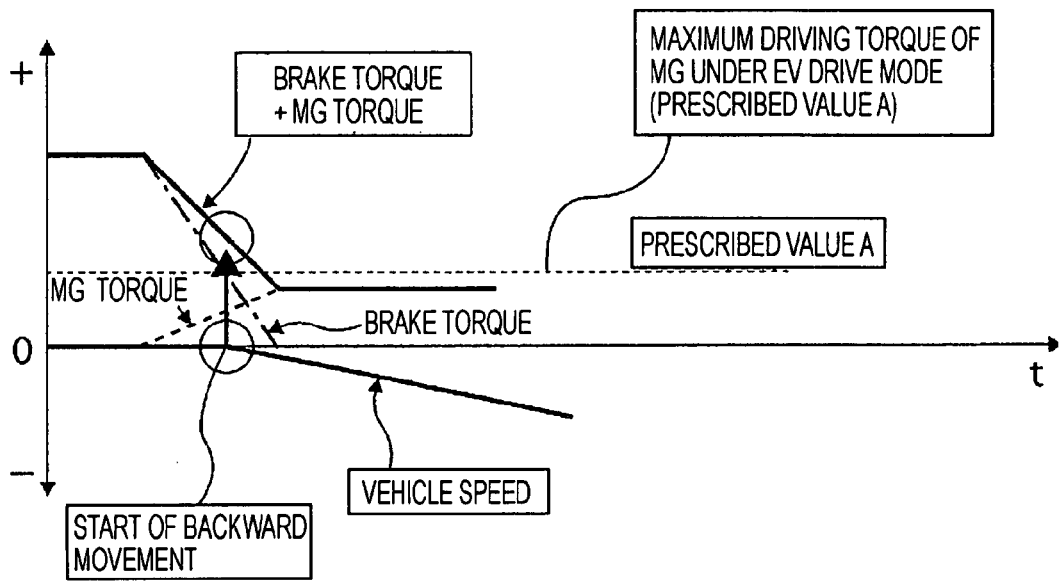
FIG. 15 is a time chart illustrating the relationships among the brake torque, the motor-generator torque, the vehicle speed and the first value A when starting the vehicle on a steep upward slope.

An operation performed for controlling the engine when starting the vehicle on a steep upward slope will now be described. When the engine is in an automatically stopped state, and the vehicle is to be started from its stopped state on a steep upward slope, if the driver implements a brake-pedal releasing operation to start the vehicle the total torque of the brake torque and the motor-generator torque decreases. Referring to FIG. 15, when the total torque falls below the slope resistance torque, the vehicle moves backward due to the slope resistance torque. At this backward movement of the vehicle on a steep upward slope, the total torque of the brake torque and the motor-generator torque becomes a value greater than the first predetermined value A. For this reason, the response to the query in step S108 is "YES," and unless the brake pedal is re-pressed, the operation proceeds through step S101, step S102, step S103, step S104, step S105, step S106, step S107, step S108, step S109, step S110 and step S111 in the flow chart in FIG. 9. In step S11, the startup process of the engine E is executed.

In other words, upon starting the vehicle on a steep upward slope, when a backward movement of the vehicle is detected during the transitional period of the brake-pedal releasing operation, it is confirmed that a driving force required by the vehicle cannot be attained with the selection of the EV drive mode in which the engine E remains in a stopped state. This is due to the fact that the total torque of the brake torque and the motor-generator torque is greater than the first predetermined value A.

Consequently, when starting the vehicle on a steep upward slope the startup of the engine E is executed at an early timing, that is, at a point when the brake pedal is released prior to pressing of the accelerator pedal, instead of performing the regular mode selection process that uses accelerator opening information. Then, the vehicle is prepared to start with the selection of one of the motor-assisted drive mode and the engine drive mode. Accordingly, a driving force required for starting the vehicle on a steep upward slope is attained, thereby reducing the amount of backward movement of the vehicle.

Although the total torque of the brake torque and the motor-generator torque at the backward-movement time of the vehicle is greater than the first predetermined value A, if the driver re-presses the brake pedal immediately after this timing the query in response to step S110 is "NO." The cycle of step S101, step S102, step S103, step S104, step S105, step S106, step S107, step S108, step S109 and step S110 in the flow chart in FIG. 9 is repeated. Moreover, in this case the drive mode is selected on the basis of the regular mode selection process in step S101.

As described above, in the engine controlling device according to the first embodiment, when the vehicle is in a stopped state while the engine E is in an automatically stopped state (step S102), the engine controlling means (FIG. 9) determines that the startup of the engine E is requested if the total of the brake torque and the motor-generator torque is greater than the first predetermined value A ("YES" in step S108) at the time of backward-movement detection. That is, at the time when the vehicle speed is a negative value in the transitional period of the brake-pedal releasing operation.

As a comparative example, if the device is set such that the engine startup is requested in response to pressing of the accelerator pedal, the engine startup request is determined when the accelerator opening increases in response to the accelerator-pedal operation. Therefore, if the slope is steep to an extent that the vehicle cannot climb the slope under the EV drive mode, a driving force required by the vehicle cannot be attained from the point at which the accelerator pedal is pressed to the startup point of the engine, thus causing the vehicle to move backward.

In contrast, according to the first embodiment, it is determined that the startup of the engine E is requested when the total of the brake torque and the motor-generator torque at the time of backward-movement detection is greater than the first predetermined value A. Therefore, the startup of the engine E is executed at an early timing, that is, at a point when the brake pedal is released prior to pressing of the accelerator pedal, and the vehicle is prepared to start with the selection of the HEV drive mode. Consequently, a driving force required for starting the vehicle on a steep upward slope is attained, thereby reducing the amount of backward movement.

In the engine controlling device according to the first embodiment, the engine controlling means (FIG. 9) implements standby for engine startup ("YES" in step S108) when it is determined that the startup of the engine E is requested and cancels the startup of the engine E if re-pressing of the brake pedal is detected within a certain time period ("YES" in step S110).

As a comparative example, in a case where the device is set such that the engine startup is always executed when it is determined that engine startup is requested, if the driver re-presses the brake pedal in order to continuously stop the vehicle on a slope with a greater brake torque, the engine startup request will undesirably be detected at a point when the brake pedal is released by a small amount. Subsequently, if the braking on the slope continues for a long period of time the engine will remain running, thus leading to high fuel consumption.

In contrast, according to the first embodiment, if re-pressing of the brake pedal is detected after the standby for engine startup the startup of the engine E is canceled. Accordingly, this prevents a determination error against the engine startup request in the case where the brake pedal is re-pressed, and thus prevents the engine from consuming fuel wastefully while the vehicle is in a stopped state, thereby contributing to lower fuel consumption.

In a case where the engine startup conditions for the engine controlling means (FIG. 9) in the first embodiment are not satisfied, the vehicle is started under the EV drive mode while the engine E is kept in an automatically stopped state. When the engine startup conditions are satisfied, the engine E is started so as to start the vehicle under the HEV drive mode, such as the engine drive mode and the motor-assisted drive mode.

Consequently, if the minimum driving torque estimated in the engine control operation at the start of the vehicle can be attained under the EV drive mode, the vehicle is started on a slope with the selection of the EV drive mode so as to achieve lower fuel consumption. On the other hand, if the estimated minimum driving torque cannot be attained under the EV drive mode, the engine E is started before the accelerator pedal is operated, and the vehicle is started on a slope with the selection of the engine drive mode or the motor-assisted drive mode. This reduces the amount of backward movement of the vehicle when starting the vehicle on a steep slope.

In the engine controlling device according to the first embodiment, a value set in the engine controlling means (FIG. 9) as a threshold value for determining a startup request of the engine E is referred to as the first predetermined value A. The first predetermined value A corresponds to the maximum driving torque of the motor-generator MG under the EV drive mode.

Therefore, the threshold value for determining a startup request of the engine E can be readily set to a value that corresponds to the maximum driving torque of the motor-generator MG. Moreover, when calculating the total torque of the brake torque and the motor-generator torque, even in a case where the motor-generator torque is zero, the value corresponding to the maximum driving torque can still be used as the threshold value without having to add the motor-generator torque proportionally to the decreasing brake torque.

The engine controlling device for the hybrid vehicle according to the first embodiment has the following advantages.

First, in the hybrid vehicle equipped with the engine E and the motor-generator MG as driving sources and having an EV drive mode in which the vehicle is driven using only the motor-generator MG as a driving source and an HEV drive mode in which the vehicle is driven while including the engine E as a driving source, when the vehicle is in a stopped state while the engine is E in an automatically stopped state (step S102), a minimum driving torque required for starting the vehicle is estimated from the relationships among the brake torque, the motor-generator torque and the vehicle speed during the transitional period of the brake-pedal releasing operation. The hybrid vehicle is provided with the engine controlling means (FIG. 9) for determining whether or not to start the engine E prior to pressing of the accelerator pedal on the basis of the estimated minimum driving torque. Consequently, the minimum driving torque required for starting the vehicle is estimated at an early time, that is, at a point when the brake pedal is released prior to the pressing of the accelerator pedal. Thereby, the amount of backward movement upon starting the vehicle on a steep slope is reduced while also achieving lower fuel consumption.

Second, when the vehicle is in a stopped state while the engine E is in an automatically stopped state (step S1102), the engine controlling means (FIG. 9) estimates that the total of the brake torque and the motor-generator torque at the time of backward-movement detection, at which the vehicle speed is a negative value in the transitional period of the brake-pedal releasing operation, corresponds to a minimum driving torque required for starting the vehicle (step S108). Therefore, the engine controlling means can accurately estimate the minimum driving torque required for starting the vehicle on an upward slope.

Third, when the vehicle is in a stopped state while the engine is E in an automatically stopped state (step S102), the engine controlling means (FIG. 9) determines that the startup of the engine E is not requested if the stopped state of the vehicle is maintained, that is, if the vehicle speed remains at zero in the transitional period of the brake-pedal releasing operation in which the total torque of the brake torque and the motor-generator torque decreases, or if a forward movement of the vehicle is detected, that is, if the vehicle speed is a positive value ("NO" in step S103). Thus, when starting the vehicle from its stopped state on a flat road or a downward slope, an optimal drive mode is selected in response to a driving force desired by the driver that corresponds to the accelerator opening APO. Accordingly, this contributes to both lower fuel consumption and high starting performance of the vehicle.

Fourth, when the vehicle is in a stopped state while the engine E is in an automatically stopped state (step S1102), the engine controlling means (FIG. 9) determines that the startup of the engine E is not requested if the total of the brake torque and the motor-generator torque is below the first predetermined value A ("NO" in step S108) at the time of backward-movement detection (step S104) at which the vehicle speed is a negative value in the transitional period of the brake-pedal releasing operation. Thus, when starting the vehicle from its stopped state on a gentle upward slope, an optimal drive mode is selected in response to a driving force desired by the driver that corresponds to the accelerator opening APO. Accordingly, this contributes to both lower fuel consumption and high starting performance of the vehicle.

Fifth, when the vehicle is in a stopped state while the engine is E in an automatically stopped state (step S102), the engine controlling means (FIG. 9) determines that the startup of the engine E is requested if the total torque of the brake torque and the motor-generator torque is greater than the first predetermined value A ("YES" in step S1108) at the time of backward-movement detection at which the vehicle speed is a negative value in the transitional period of the brake-pedal releasing operation. Thus, the startup of the engine E is executed at an early time, that is, at a point when the brake pedal is released prior to pressing of the accelerator pedal, and the vehicle is prepared to start with the selection of the HEV drive mode. Consequently, a driving force required for starting the vehicle on a steep upward slope is attained, thereby reducing the amount of backward movement of the vehicle.

Sixth, the engine controlling means (FIG. 9) implements standby for engine startup ("YES" in step S108) when it is determined that the startup of the engine E is requested and cancels the startup of the engine E if re-pressing of the brake pedal is detected within a certain time period ("YES" in step S110). Accordingly, this prevents a determination error against the engine startup request in the case where the brake pedal is re-pressed, and thus prevents the engine from consuming fuel wastefully while the vehicle is in a stopped state. This contributes to lower fuel consumption.

Seventh, the hybrid vehicle has a hybrid driving system that includes the first clutch CL1 interposed between the engine E and the motor-generator MG and the second clutch CL2 interposed between the motor-generator MG and the drive wheels RR, RL. Furthermore, the hybrid vehicle has the EV drive mode in which the first clutch CL1 is disengaged such that the vehicle is driven using only the motor-generator MG as a driving source. The hybrid vehicle also has the HEV drive mode, which includes three drive modes: (1) the engine drive mode in which the first clutch CL1 is engaged such that the drive wheels are driven with only the engine E as a driving source; (2) the motor-assisted drive mode in which the drive wheels are driven with two driving sources, namely, the engine E and the motor-generator MG; and (3) the driving/power-generating mode in which the drive wheels RR, RL are driven with the engine E as a driving source while the motor-generator MG functions as a power generator. In a case where the engine startup conditions for the engine controlling means (FIG. 9) are not satisfied, the vehicle is started under the EV drive mode while the engine E is kept in an automatically stopped state. When the engine startup conditions are satisfied, the engine E is started so as to start the vehicle under the HEV drive mode, such as the engine drive mode and the motor-assisted drive mode. Consequently, if the minimum driving torque estimated in the engine control operation at the start of the vehicle can be attained under the EV drive mode, the vehicle is started on a slope with the selection of the EV drive mode so as to achieve lower fuel consumption. On the other hand, if the estimated minimum driving torque cannot be attained under the EV drive mode, the engine E is started before the accelerator pedal is operated, and the vehicle is started on a slope with the selection of the engine drive mode or the motor-assisted drive mode, thereby reducing the amount of backward movement of the vehicle when starting the vehicle on a steep slope.

Eighth, the value set in the engine controlling means (FIG. 9) as a threshold value for determining a startup request of the engine E is referred to as the first predetermined value A, which corresponds to the maximum driving torque of the motor-generator MG under the EV drive mode. Moreover, when calculating the total torque of the brake torque and the motor-generator torque, even in a case where the motor-generator torque is zero, the value corresponding to the maximum driving torque can still be used as the threshold value without having to add the motor-generator torque proportionally to the decreasing brake torque.

A second embodiment according to the invention is directed to an example in which the threshold value for determining a startup request of the engine E is referred to as a second predetermined value B, which is determined by subtracting the motor-generator torque from the maximum driving torque of the motor-generator MG under the EV drive mode.

The configuration of the second embodiment is described first. The overall configuration is the same as that of the first embodiment shown in FIGS. 1 to 8, and therefore the description and illustration thereof will not be repeated.

Figure 16:
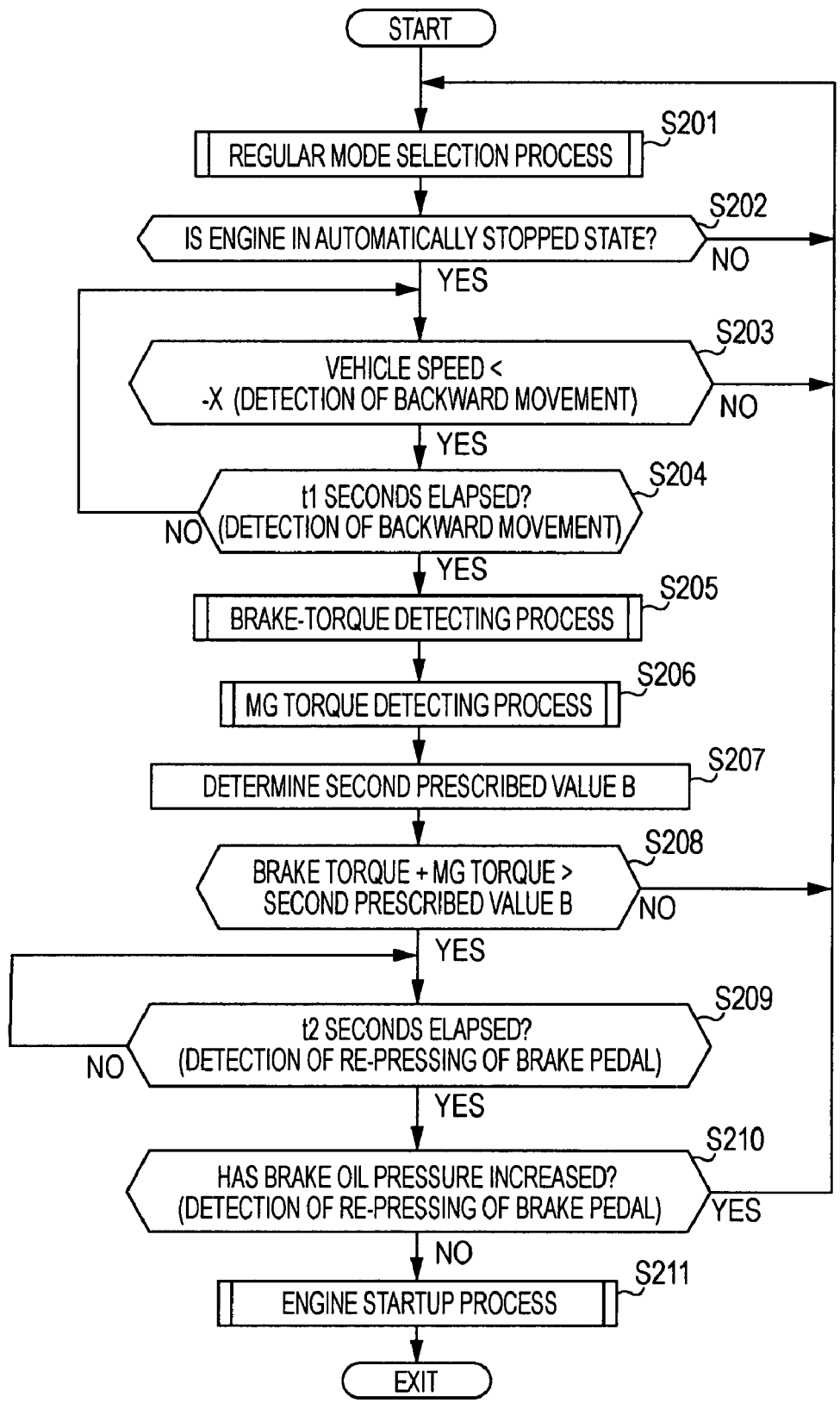
FIG. 16 is a flow chart illustrating an engine controlling process executed in an integrated controller according to a second embodiment of the invention.

FIG. 16 is a flow chart illustrating an engine controlling process performed by the integrated controller 10 of the second embodiment. The steps included in this process are described below. Step S201 to step S206 and step S209 to step S211 respectively correspond to step S101 to step S106 and step S109 to step S111 in the flow chart of the first embodiment shown in FIG. 9. Therefore, the descriptions of these steps will not be repeated.

Step S207 follows the motor-generator torque detecting process performed in step S206. In step S207 the second predetermined value B, which is the threshold value for determining a startup request of the engine E, is set to a value (variable value) that is determined by subtracting the motor-generator torque from the maximum driving torque of the motor-generator MG under the EV drive mode. The operation then proceeds to step S208.

Figure 17:
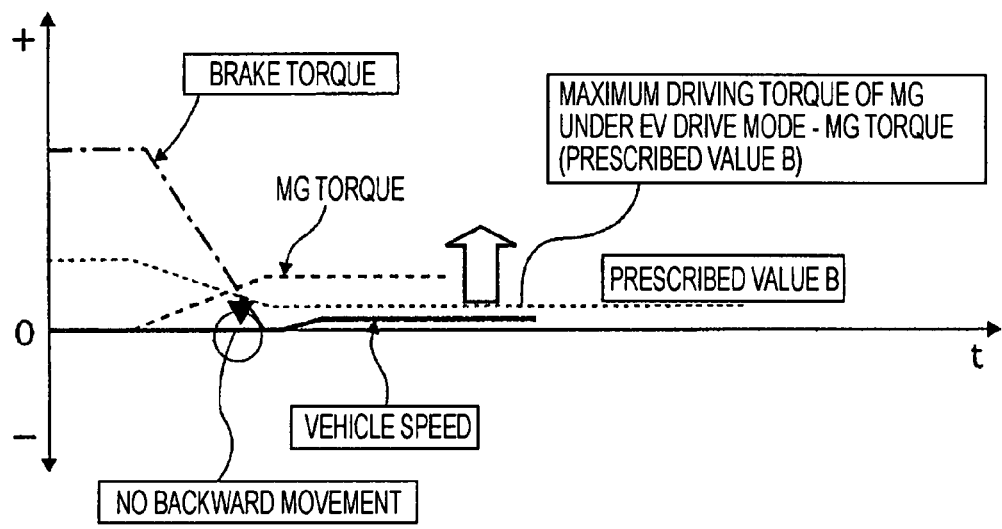
FIG. 17 is a time chart illustrating the relationships among the brake torque, the motor-generator torque, the vehicle speed and a second value B when starting the vehicle on a flat road.
Figure 18:
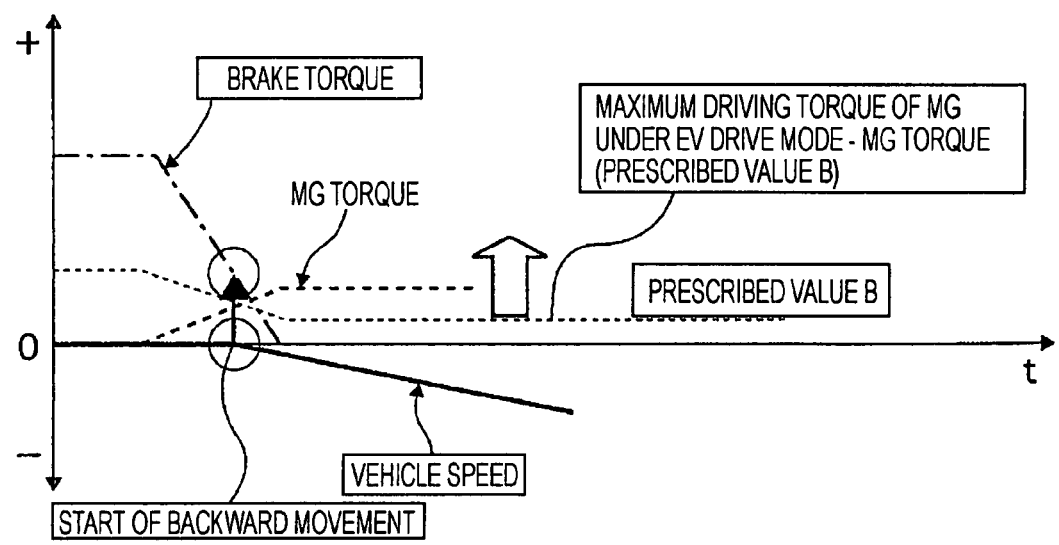
FIG. 18 is a time chart illustrating the relationships among the brake torque, the motor-generator torque, the vehicle speed and the second value B when starting the vehicle on a steep upward slope.

In this case, since the motor-generator torque is added proportionally to the decreasing brake torque, the second predetermined value B has characteristics in which the value decreases in proportion to the decrease in the brake torque (see characteristics shown with a dotted line in FIGS. 17 and 18).

After determining the second predetermined value B in step S207, it is determined in step S208 whether or not the total of the brake torque in step S205 and the motor-generator torque in step S206 is greater than the second predetermined value B. If yes, an engine startup standby flag is raised, and the operation proceeds to step S209. If no, processing returns to step S201.

In the engine controlling device for the hybrid vehicle according to the second embodiment, an operation performed when starting the vehicle on a flat road or a downward slope, an operation performed when starting the vehicle on a gentle upward slope and an operation performed for controlling the engine when starting the vehicle on a steep upward slope are the same as those in the first embodiment except for the fact that the first predetermined value A is replaced by the second predetermined value B.

Specifically, when the engine is in an automatically stopped state, and the vehicle is to be started from its stopped state on a flat road, even if the driver implements a brake-pedal releasing operation to start the vehicle the vehicle speed will remain at zero or the vehicle will slightly move forward due to the motor-generator torque as shown in FIG. 17. Consequently, since the vehicle does not move backward, the determination in step S203 is "NO." The cycle of step S201, step S202, and step S203 in the flow chart in FIG. 16 is repeated. Moreover, the drive mode is selected on the basis of the regular mode selection process in step S201.

When the engine is in an automatically stopped state, and the vehicle is to be started from its stopped state on a steep upward slope, if the driver implements a brake-pedal releasing operation to start the vehicle the total torque of the brake torque and the motor-generator torque decreases. Referring to FIG. 18, the vehicle moves backward when the total torque falls below the slope resistance torque. At this backward-movement of the vehicle on a steep upward slope, the total torque of the brake torque and the motor-generator torque becomes a value greater than the second predetermined value B. For this reason, the response to the query in step S208 is "YES." Unless the brake pedal is re-pressed, the operation proceeds through step S201, step S202, step S203, step S204, step S205, step S206, step S207, step S208, step S209, step S210 and step S211 in the flow chart in FIG. 16. In step S211, the startup process of the engine E is executed.

In addition to the first through seventh advantages of the first embodiment described above, the engine controlling device for the hybrid vehicle according to the second embodiment has an additional advantage. The value set in the engine controlling means (FIG. 16) as a threshold value for determining a startup request of the engine E is referred to as the second predetermined value B, which is determined by subtracting the motor-generator torque from the maximum driving torque of the motor-generator MG under the EV drive mode. Therefore, in a case where the motor-generator torque is to be added proportionally to the decreasing brake torque, the amount of motor-generator torque included in the total torque of the brake torque and the motor-generator torque is taken into account. Consequently, unlike the case where the value is provided as a fixed value, an optimal value can be accurately provided as a threshold value for determining a startup request of the engine E.

An engine controlling device for a hybrid vehicle according to the present invention has been described above with reference to the first and second embodiments. However, it should be noted that the technical scope of the invention is not limited to the above embodiments, and modifications are permissible within the scope of the invention.

In the example of the engine controlling means in the first and second embodiments, the motor-generator torque is given as a torque that increases in proportion to the decrease in the brake torque. Alternatively, as a method for controlling the motor-generator torque, the engine controlling means is applicable to any type of hybrid vehicle that allows for detection of the motor-generator torque. Furthermore, the engine controlling means is similarly applicable to a case where the motor-generator torque remains at zero even as the brake torque decreases. In other words, the engine controlling means is not limited to the first and second embodiments as long as the engine controlling means can estimate a minimum driving torque required for starting the vehicle when the vehicle is in a stopped state while the engine is E in an automatically stopped state, from the relationships among the brake torque, the motor-generator torque, and the vehicle speed in the transitional period of the brake-pedal releasing operation, and can also determine whether to start the engine prior to pressing of the accelerator pedal on the basis of the estimated minimum driving torque.

Although the first and second embodiments are directed to a rear-wheel-drive hybrid vehicle, the invention is also applicable to a front-wheel-drive hybrid vehicle or a four-wheel-drive hybrid vehicle. Furthermore, although the first and second embodiments are directed to an example in which the second clutch is contained within the automatic transmission, the second clutch may alternatively be provided as an additional clutch interposed between the motor-generator and the transmission or between the transmission and the drive wheels (see, for example, Japanese Unexamined Patent Application Publication No. 2002-144921). Furthermore, the invention is also applicable to a hybrid vehicle that has only a first clutch (i.e., engine clutch), or to a hybrid vehicle that achieves the hybrid drive mode (i.e., HEV drive mode) and the electric-vehicle drive mode (i.e., EV drive mode) without having the first and second clutches. In other words, the invention is applicable to any type of hybrid vehicle that is equipped with an engine and a motor-generator as driving sources, and that has the EV drive mode in which the vehicle is driven using only the motor-generator as a driving source and the HEV drive mode in which the vehicle is driven while including the engine as a driving source.

In the first and second embodiments, the engine is started when the driving force of the engine is necessary. However, as apparent from claim 1, the engine could be rotating while the clutch is disengaged even when the vehicle is in a stopped state. This could occur when, for example, the amount of charge of the battery is low. As a consequence, although an engine startup process is described with reference to step S11 and step S211, instead a process for engaging the clutch Cl1 could be implemented in these steps.

Also, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A controlling device for a hybrid vehicle, comprising:
an engine;
a motor-generator;
wheels for moving the hybrid vehicle;
a brake for braking the wheels; and
a controller operable to:

estimate an estimated driving force required for a forward movement of the vehicle after a start of release by a driver of a brake engagement device from a state where the vehicle is stopped by the brake and before the driver's intention to accelerate is detected from engagement of an accelerator, the estimated driving force based on relationships among a braking force of the brake, a driving force of the motor-generator and a vehicle speed; and determine whether to use the engine for a driving force of the hybrid vehicle based on the estimated driving force.

2. The controlling device for the hybrid vehicle according to claim 1 wherein the controller is further operable to start the engine when the controller determines that it is necessary to use the driving force of the engine whether or not the driver's intention to accelerate is detected.

3. The controlling device for the hybrid vehicle according to claim 2 wherein the controller is further operable to cancel the start of the engine after the controller determines that it is necessary to use the driving force of the engine if the brake engagement device is re-pressed within a predetermined time period after the start of release of the brake engagement device.

4. The controlling device for the hybrid vehicle according to claim 1 wherein the controller is further operable to determine that it is not necessary to use the driving force of the engine if the vehicle speed is zero or higher after the start of release of the brake engagement device.

5. The controlling device for the hybrid vehicle according to claim 1, further comprising:
a first clutch interposed between the engine and the motor-generator, the first clutch being capable of changing a torque transfer capacity; and wherein the controller is further operable to allow engagement of the first clutch when the controller determines it is necessary to use the driving force of the engine.

6. The controlling device for the hybrid vehicle according to claim 5 wherein the controller is further operable to start the engine using the motor-generator when the first clutch becomes engaged in a state where the engine is not rotating.

7. A controlling device for a hybrid vehicle, comprising:
an engine;
a motor-generator;
wheels for moving the hybrid vehicle;
a brake for braking the wheels; and
a controller operable to:
estimate an estimated driving force required for a forward movement of the vehicle when the brake is to be released from a state where the vehicle is stopped by the brake, the estimated driving force based on relationships among a braking force of the brake, a driving force of the motor-generator and a vehicle speed; and
determine whether to use the engine for a driving force of the hybrid vehicle based on the estimated driving force;
wherein the estimated driving force is based on a total torque of a brake torque and a motor-generator torque when the vehicle speed is a negative value.

8. The controlling device for the hybrid vehicle according to claim 7 wherein the controller is further operable to use the driving force of the engine if the total torque is greater than a predetermined torque value.

9. The controlling device for the hybrid vehicle according to claim 8 wherein the predetermined torque value comprises a maximum driving torque of the motor-generator.

10. The controlling device for the hybrid vehicle according to claim 8 wherein the predetermined torque value is equal to a value of a current motor-generator torque subtracted from a predetermined maximum driving torque of the motor-generator.

11. The controlling device for the hybrid vehicle according to claim 7 wherein the controller is further operable to determine that it is not necessary to use the driving force of the engine if the total torque is equal to or less than a predetermined torque value.

12. The controlling device for the hybrid vehicle according to claim 11 wherein the predetermined torque value comprises a predetermined maximum driving torque of the motor-generator.

13. A controlling device for a hybrid vehicle having an engine, a motor-generator and a brake for braking wheels of the hybrid vehicle, the device comprising:
means for estimating an estimated driving force required for a forward movement of the vehicle after a start of release by a driver of a brake engagement device from a state where the vehicle is stopped by the brake and before a driver's intention to accelerate is detected from engagement of an accelerator; wherein the estimated driving force is based on relationships among a braking force of the brake, a driving force of the motor-generator and a vehicle speed; and
means for determining whether to use the engine for a driving force of the hybrid vehicle based on the estimated driving force.

14. A method for controlling a hybrid vehicle having an engine, a motor-generator and a brake for braking wheels of the hybrid vehicle, the method comprising:
estimating an estimated driving force required for a forward movement of the vehicle after a start of release by a driver of a brake engagement device from a state where the vehicle is stopped by the brake and before the driver's intention to accelerate is detected from engagement of an accelerator; wherein the estimated driving force is based on relationships among a braking force of the brake, a driving force of the motor-generator and a vehicle speed; and
determining whether to use the engine for a driving force of the hybrid vehicle based on the estimated driving force.

15. The method according to claim 14 wherein the estimated driving force is based on a total torque of a brake torque and a motor-generator torque when the vehicle speed is a negative value and wherein determining whether to use the engine for the driving force further comprises:
using the driving force of the engine if the total torque is greater than a predetermined torque value.

16. The method according to claim 15 wherein the predetermined torque value comprises a maximum driving torque of the motor-generator.

17. The method according to claim 15, further comprising:
subtracting a current motor-generator torque from a predetermined maximum driving torque of the motor-generator; wherein a result of the subtracting step is the predetermined torque value.

18. The method according to claim 14 wherein the estimated driving force is based on a total torque of a brake torque and a motor-generator torque when the vehicle speed is a negative value and wherein determining whether to use the engine for the driving force further comprises:
determining that it is not necessary to use the driving force of the engine after the start of release of the brake engagement device if the total torque is equal to or less than a predetermined torque value.

19. The method according to claim 14 wherein determining whether to use the engine for the driving force further comprises:
   deciding to start the engine when the estimated driving force is below a necessary force and before the driver's intention to accelerate is detected; and
   canceling the start of the engine if the brake engagement device is re-pressed within a predetermined time period after deciding to start the engine and before the driver's intention to accelerate is detected.

20. The method according to claim 14, the hybrid vehicle having a first clutch interposed between the engine and the motor-generator; and wherein determining whether to use the engine for the driving force further comprises:
   allowing engagement of the first clutch when the estimated driving force is below a necessary force.

* * * * *